United States Patent [19]

Sakamoto et al.

[11] Patent Number: 4,561,061
[45] Date of Patent: Dec. 24, 1985

[54] METHOD OF TRACING/RECORDING IMAGE LINES AND APPARATUS THEREFOR

[75] Inventors: Takashi Sakamoto; Tetsuo Sano; Eiji Kodama; Masamichi Choh, all of Kyoto, Japan

[73] Assignee: Dainippon Screen Mfg. Co., Ltd., Japan

[21] Appl. No.: 362,101

[22] Filed: Mar. 26, 1982

[30] Foreign Application Priority Data

Apr. 6, 1981 [JP] Japan .................. 56-52106

[51] Int. Cl.⁴ .................. G05B 1/00; G06F 15/40
[52] U.S. Cl. .................. 364/550; 250/202; 364/518; 382/22
[58] Field of Search .............. 364/518, 522, 519–521; 382/59, 15, 48, 22, 23, 21, 37, 16; 358/76, 77, 78, 256; 340/708; 318/577; 250/202

[56] References Cited

U.S. PATENT DOCUMENTS

| | | | |
|---|---|---|---|
| 3,534,396 | 10/1965 | Hart et al. | 364/518 X |
| 4,115,761 | 9/1978 | Ueda et al. | 382/37 X |
| 4,214,276 | 7/1980 | Pugsley et al. | 358/256 |
| 4,300,170 | 11/1981 | Sakamoto | 318/577 X |
| 4,319,331 | 3/1982 | Elbaum et al. | 364/518 X |
| 4,326,190 | 4/1982 | Borland et al. | 382/21 |
| 4,441,020 | 4/1984 | Sakamoto et al. | 318/577 X |

FOREIGN PATENT DOCUMENTS 2920070 11/1980 Fed. Rep. of Germany.
0187761 11/1982 Japan .................. 364/518

*Primary Examiner*—Errol A. Krass
*Assistant Examiner*—Kevin J. Teska
*Attorney, Agent, or Firm*—Brumbaugh, Graves, Donohue & Raymond

[57] ABSTRACT

An apparatus for tracing and recording image lines includes a coordinate reader which detects coordinate values of an image to be traced; an image sensor which is movable in a plane relative to a table; a memory in which image signals detected by means of the sensor are written; and a central processing unit which controls the above elements of the apparatus. Trace data are obtained by means of the coordinate reader which detects coordinate values of the image lines. Then, the image is positioned on the table, where record data are obtained based on the trace data by means of the image sensor which generates image signals corresponding exactly to the image.

7 Claims, 10 Drawing Figures

METHOD OF TRACING/RECORDING IMAGE LINES AND APPARATUS THEREFOR

BACKGROUND OF THE INVENTION

The present invention relates to a method of tracing and recording image lines, which traces the contour of images recorded in a photo film or the line patterns of a line drawing, and records the image contour or the line patterns. The invention particularly relates to a method of producing a cut-out mask. Further, the invention relates to an apparatus for tracing and recording image lines.

In the printing of catalogues, photographs of goods in which a background is included must be masked to eliminate the background, so that only the picture of the goods to be illustrated is represented in a catalogue. A cut-out mask used for such printing is obtained through the following process. First a mask film is produced which has a transparent section exactly corresponding to the external outline of the goods and an opaque section exactly corresponding to the background of the goods. Then the mask is placed over the original film so that the external outline of the goods in the original film is exactly consistent with that of the mask film. The picture of the goods is then reproduced without the background. Also, such a cut-out mask is used to substitute another background in place of the eliminated background or to produce a negative image from a positive image. In these cases the relation between the transparent and opaque section is reversed.

The preparation of such a cut-out mask has conventionally been done by hand. That is, the cut-out mask has been obtained through the following process. First the contour of the image to be cut out is drawn on a transparent sheet in the same manner as a tracing. The area inside or outside the contour is then coated with opaque ink. Such operations require a skillful and proficient operator, and moreover much time is required. For these reasons masking of photographs has presented a serious problem in photoprocessing operations.

The Japanese laid open Specification No. 47-17501 discloses a method of producing a cut-out mask. According to that laid open specification the background of a required image is given a specific color for color photography. Then only the specific color of the background is taken out or eliminated with a processing color-scanner when the color image is duplicated. That method requires so much attention to the photography that it has not been widely adopted.

Another Japanese laid open Specification No. 55-57846 (Japanese Application No. 53-131195) discloses a method of producing a cut-out mask which attempts to solve the above disadvantages. According to that specification detector elements such as photoelectric convertors are used to combine automatic traces of the detector elements with a manual trace drawing. A detector is divided into eight elements 1-8, as shown in FIG. 1 which is a plan view of a prior photoelectric element. However, that method has the disadvantages that, when the photo film including an original image has fold lines extending across the outline of the goods to be cut out, the detector elements trace the fold lines, diverging from the contour to be traced, and, when the original image has any border lines of different thickness which may easily be mistaken for the contour lines within the image area to be cut out, the detector elements trace the border lines in error. Accordingly, the detector is arranged so that the required image contour is traced and recorded automatically in a straight or gradual curve portion, based upon signals from the detector elements, and when the contour of the required image has fold lines or border lines, the automatic trace produced by the detector elements is stopped and the contour is traced by hand at these portions.

The prior arts as mentioned above, however, cannot thoroughly solve the conventional disadvantages.

BRIEF SUMMARY OF THE INVENTION

Accordingly, it is an object of the present invention to provide a method of tracing and recording image lines, particularly the contour of images, which enables a cutout mask to be produced easily and accurately.

It is another object of the present invention to provide a method of tracing and recording image lines which exactly traces the contour of the image to be cut out without any errors even at fold lines or border lines.

It is another object of the present invention to provide an apparatus for carrying out the above method.

In accordance with the invention the outline of an image to be masked is first traced approximately by a manual curve tracer and the coordinates of the outline are recorded in a memory. The image outline is then scanned automatically, based on the recorded trace coordinates, to produce a precise record of the image outline.

BRIEF DESCRIPTION OF THE DRAWINGS

In the accompanying drawings

DESCRIPTION OF PREFERRED EMBODIMENTS

Figure 1:
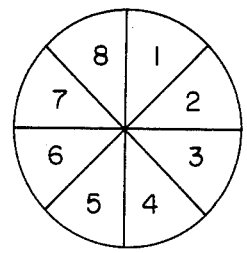
FIG. 1 is a schematic illustration of a photo cell used in prior art devices.
Figure 2:
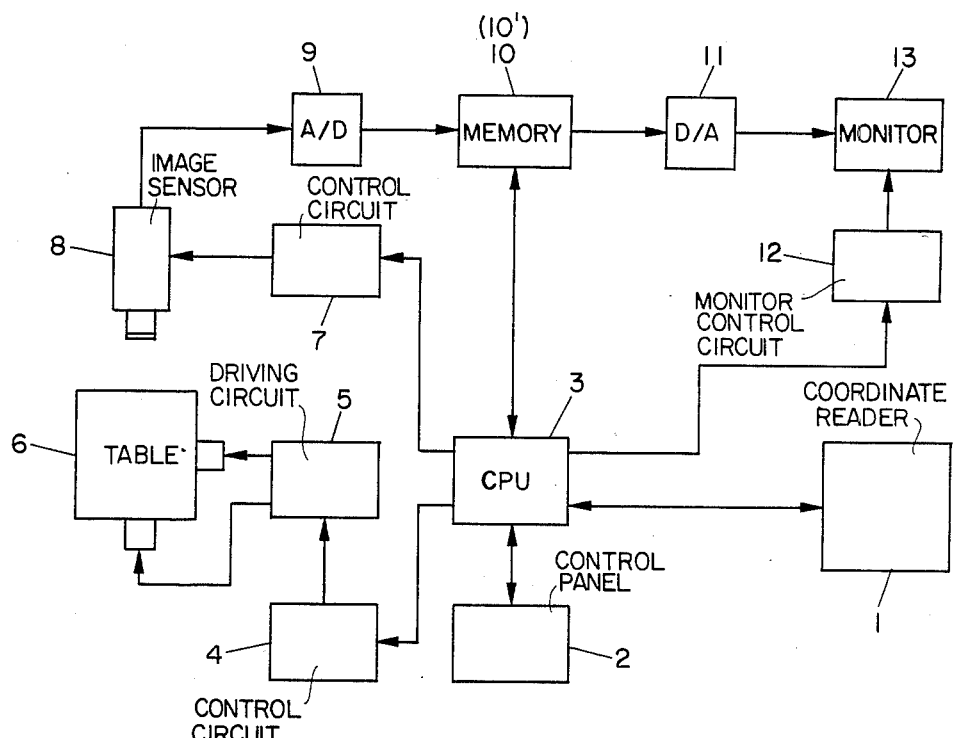
FIG. 2 is a schematic block diagram illustrating one embodiment of the present invention.

Referring to FIG. 2, which is a block diagram of one embodiment according to the present invention, a coordinate reader 1 (for example a digitizer) detects the coordinate position of an image to be traced, and the signals detected by the digitizer are conducted to a central processing unit (CPU) 3 which controls various components in accordance with instructions. All the operations of the apparatus are controlled from a control panel 2 by an operator. A table 6 is driven in X-axis and Y-axis directions by a driving circuit 5 which is controlled by a control circuit 4. The operation of the table 6 is carried out according to instructions from the CPU 3. An image sensor 8 is directed at the surface of the table 6 and has a receiving surface which is composed of a great number (for example 100×100) of very small photo cells aligned in matrix form. The operation of the image sensor 8 is controlled by a control circuit 7 according to instructions from the CPU 3, and analog image signals detected by the sensor 8 are converted to digital signals by a A/D convertor 9, and are then written into a memory 10.

The output from the memory 10 is converted to analog form by a D/A convertor 11 and then conducted to a monitor 13. The monitor 13 is controlled by a monitor control circuit 12 according to instructions from the CPU 3. In case the image to be traced and recorded is a simple figure, the monitor 13 may not be required. If the monitor 13 is provided as shown in FIG. 2, there must be two memories, one for monitoring and the other for data processing.

According to the present invention, a photo film having an image to be traced is first placed on the coordinate reader 1 and positioned at reference position by means of positioning means such as registration pins which engage corresponding holes in the film. Then the contour of the image is followed by a curve tracer associated with the coordinate reader, allowing a certain range of aberration in the readings. In this way a series of approximate coordinate values of the contour are read and are written into the CPU 3 as trace data. The photo film is then placed at a predetermined position on the table 6 in the same positional relation with the coordinate positions as it was in the coordinate reader. Depressing a start button on the control panel 2, the table 6 is moved relatively to the image sensor 8 in X-axis and Y-axis directions so that the image sensor 8 is positioned exactly above an initial data input position of the image contour. The initial data input position is determined by checking the direction of the trace data which is preliminarily written into the memory 10.

Figure 3:
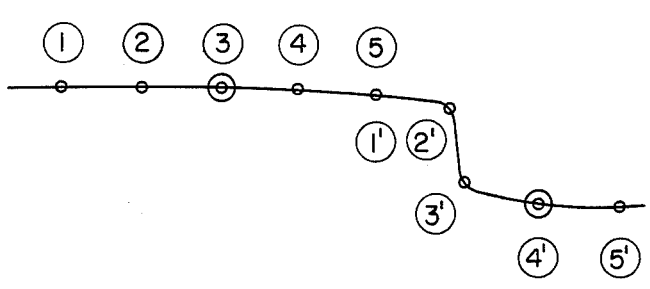
FIG. 3 is a schematic illustration showing the determination of data input positions.
Figure 4:
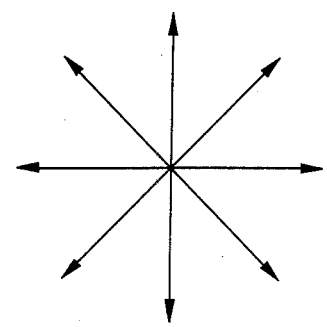
FIG. 4 is a schematic illustration of the directions of trace data.

As an example, assume that the trace data is composed of the representative points at intervals of a predetermined length, taken from a series of the coordinate values read by the coordinate reader 1 as shown in FIG. 3. The direction of the trace segment between two representative points adjacent to each other is checked every five continuous points (every four segments) to determine the data input position. That is, in a portion of the contour shown in FIG. 3 composed of five representative points ①, ②, ③, ④, ⑤, first the X-axis and Y-axis coordinate values of three points ②, ③, ④, are respectively detected to read respective directions of the segments ②-③, ③-④, then these segments are applied to eight directions as shown in FIG. 4, whereby, if the angle between the segments ②-③ and ③-④ is within ±45°, the point ③ is taken as the data input position. Conversely, if the angle is greater than ±45°, then the coordinate values of three points ①, ②, ③ are respectively detected again in the same manner as above, and if the angle between the segments ①-② and ②-③ is within ±45°, the point ② is taken as the data input position. If the angle is still greater than ±45°, the coordinate values of three further points ③, ④, ⑤ are respectively detected in the same manner as above.

Accordingly, in the portion of the contour composed of five points ①, ②, ③, ④, ⑤ shown in FIG. 3, the data input position is determined at the point ③.

The following table shows an example of the priority order for checking of the representative points and the data input position corresponding to each order:

| Priority Order | Combination of Points | Data Input Position |
| --- | --- | --- |
| 1 | ②-③-④ | ③ |
| 2 | ①-②-③ | ② |
| 3 | ③-④-⑤ | ④ |
| 4 | ①-③-④ | ③ |
| 5 | ②-③-⑤ | ③ |
| 6 | ①-③-⑤ | ③ |

Then, in another portion of the contour composed of representative points ①', ②', ③', ④', ⑤', the data input position is determined in the same manner based on the above table, and the data input position is determined initially at the point ④'.

Thus, the image sensor 8 is positioned at the intial data input position which is selected in the manner described above. Then, the image sensor 8 writes image signals which correspond to the image projected on the receiving surface thereof into the memory 10 through the A/D converter 9, according to instructions of the CPU 3 as received through the control circuit 7. After that, the image signals written in the predetermined address of the memory 10 are read out to the CPU 3 in order, and record data corresponding to the data input positions are obtained by an arithmetic operation. The arithmetic operation is carried out at every data input position, and the record data are arranged to overlap to some extent the record data produced at adjacent data input positions as described in detail hereinafter.

Figure 5:
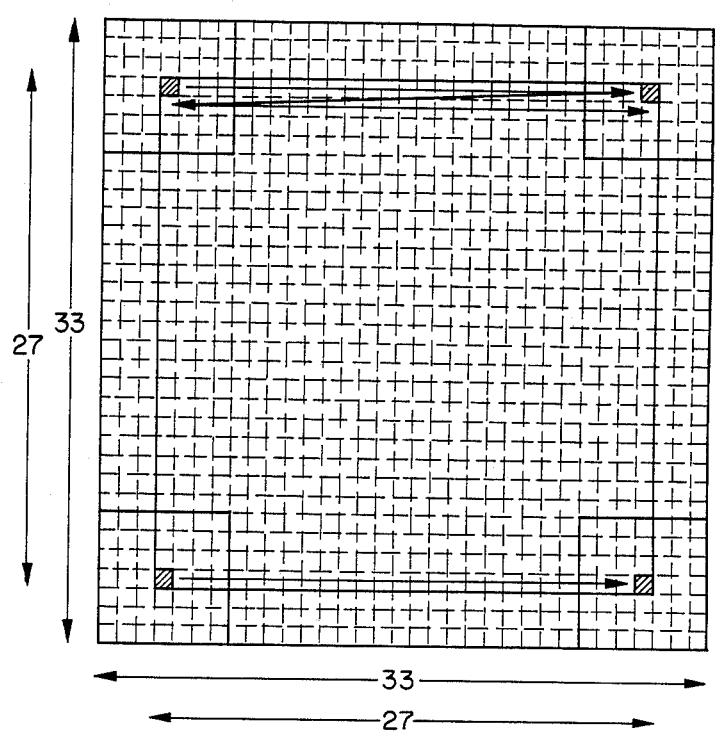
FIG. 5 is a plan view showing the receiving surface of an image sensor.

Suppose, for example, the receiving surface of the image sensor 8 is composed of 33×33 photo cell segments as shown in FIG. 5, and an operating area composed of 7×7 pieces is selected on the receiving surface, the arithmetic operation is performed in the following manner, according to the present invention. The operating area moves both horizontally and vertically one cell at a time so as to scan the whole receiving surface of the image sensor 8. The value of the signal from a selected photo cell in the operating area, shown by shading in FIG. 5, is compared, after each shift of the operating area, with the average signal value for the operating area, and the entire receiving surface may be judged to be too high or too low as a result of the comparison.

The determination of the average signal value and the comparison with the selected cell signal value are respectively made as follows. Image density signals are read out from the address of the memory 10 corresponding to respective operating areas at every movement of the operating area, and are processed in the CPU 3. If a selected cell is located at the center of the operating area as shown in FIG. 5, the position of the receiving surface of the cell receiving an image of the trace which is to be judged high or low is defined as shown by a thick continuous line which is smaller than the whole receiving surface of the operating area. After all the photo cells of the whole receiving surface are determined to be high or low in signal value, the boundary between the high and low sections is traced, and the coordinate values corresponding to the boundary are taken as the record data. Thus, the position to be taken as a trace starting point may be determined.

Figure 6:
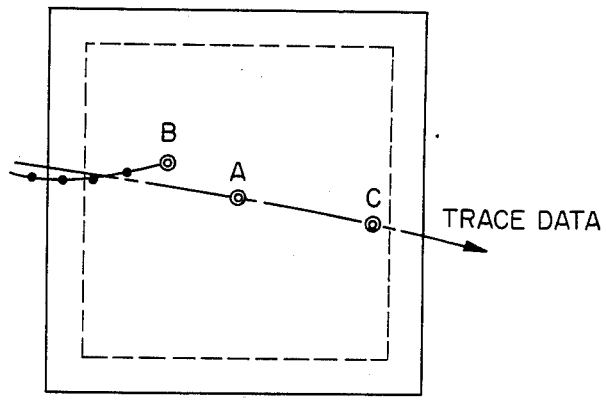
FIG. 6 is a schematic illustration showing an initial data input position in the receiving surface.

As the trace starting point, the following three points (as shown in FIG. 6) might be listed: point A, the center of the receiving surface, which corresponds to the data input position; point B, the final coordinate position of the previous record data; and point C, which is located immediately before departure from the actual receiving surface where the trace data is analyzed further from the data input position in the advancing direction. As described above, the point A is taken as the trace starting point. In this case, therefore, the record data is obtained by detecting a boundary section which has a density difference greater than a predetermined level, on the boundary closest to the point A and approximately in conformity with the direction of the trace data previously obtained as the input of the coordinate reader 1 and then tracing the boundary from that point in forward and backward directions. The record data obtained at every data input position in the manner as described above have overlap sections respectively between the actual receiving surface at a certain data input position and that at adjacent data input positions. Accordingly, the record data obtained at the certain input position are either overlapped with the record data obtained at the adjacent data input positions, or are separated to some extent, or are separated completely.

If the top or end of the adjacent record data is overlapped, either one of the record data is taken as the final record data without connecting the adjacent data.

Figure 7A:
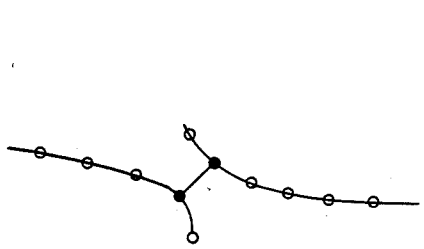
FIGS. 7A and 7B are enlarged schematic illustrations showing a supplementing process to provide a missing trace section between adjacent data input positions.

If the top end of the record data obtained at the certain data input position is placed comparatively close to the tail end of the record data obtained at the preceding operation, as shown in FIG. 7A, it is necessary to connect both data sets. For the connection, the distance between coordinate points that comprise respective record data is checked to detect the coordinate point of the minimum distance to each record data, and these coordinate points are connected to be the final record data.

Figure 7B:
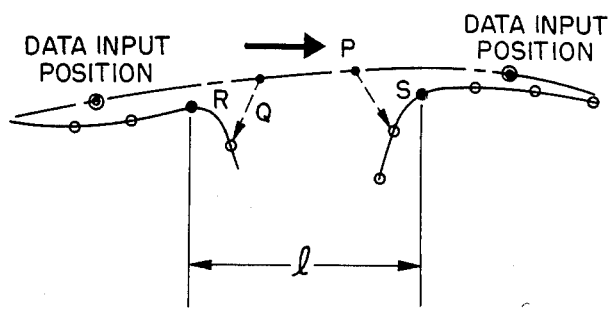

If the top end of the record data obtained at a certain data input position is separated somewhat from the tail end of the record data obtained during the preceding operation, as shown in FIG. 7B, it is possible to produce the final record data by directly connecting the coordinate point R and S when the distance 1 between the coordinate point R and S is not too large. The coordinate point R is rather close to the coordinate point Q where the end of the actual receiving surface intersects the trace data and the direction is approximately in conformity with the trace data, and the coordinate point S is rather close to the coordinate point P where the tail end of the actual receiving surface of the preceding operation intersects the trace data, and is also close to the coordinate point of the record data, but the direction is approximately the same as that of trace data.

The record data may be used when the image on a photo film has a simple figure since they are for controlling the output equipment, for example a table, cutter, or heat pen composed of the same relative movement relationship with practically the same relative movements as between the table 6 and the image sensor 8 shown in FIG. 2. In this case, it is also possible to write the final record data into the memory 10 for the image writing or into a memory portion 10' within the memory 10 which is used for line images after coordinate conversion to read the record data according to instructions of the CPU 3, and to display on the monitor 13 the image corresponding to the record data with contraction or expansion.

Actually, however, a simple figure or photo film having a distinct density difference is not often used as an image to be traced. For example, if the brightness of the image to be traced is equal to that of a part of the background, the record data obtained at the adjacent positions cannot be connected. According to the present invention, the apparatus is arranged so that the necessary correction is made to eliminate such discontinuous record data.

This is done by analyzing the record data read out from the memory 10' to the CPU 3, detecting the missing trace, and actuating the driving circuit 5 for the table 6 according to instructions from the control circuit 4 based on the instructions from the CPU 3 so as to move the image sensor 8 to the coordinate position corresponding to the missing trace section. After that, the image corresponding to the record data before and after the missing trace section is displayed on the monitor 13 with the original image corresponding to the missing section as the background, and the coordinate data of the missing section are added by tracing the original image of the missing section with the curve tracer associated with the coordinate reader, which input position may be indicated on the monitor 13 by a flickering image portion. This correction can be performed on all of the missing trace sections of the record data. Then the entire image corresponding to all the record data is displayed on the monitor with contraction or expansion so as to enable visual proving and checking.

Figure 8A:
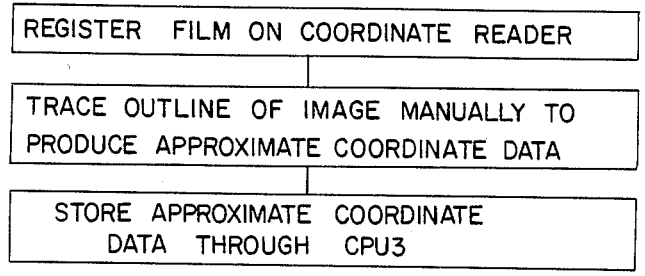
FIGS. 8A and 8B are flow charts showing the steps carried out in a representative embodiment of the invention.
Figure 8B:
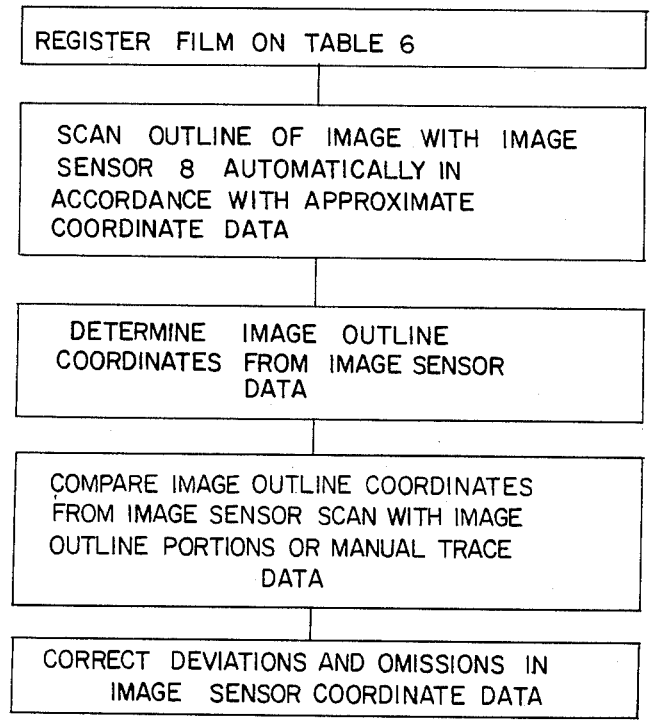

If incorrect boundary tracing is found in the monitor at any data input position, the correction of the incorrect section can be made in the same manner as above. That is, moving the curve tracer attached to the coordinate reader, detecting the coordinate position on the record data closest to the incorrect point by the input of the signals from the curve tracer into the CPU 3 when the curve tracer input position displayed on the monitor 13 reaches the specified portion of the whole image, and displaying the original image near the coordinate and also the image corresponding to the record data on the monitor 13. FIGS. 8A and 8B are flow charts illustrating a representative method for carrying out the invention in the manner described above.

We claim:

1. A method for producing an accurate outline of a selected image portion in a picture, said method comprising manually tracing the outline of the image portion to produce outline coordinate data approximately representing the image outline, storing the approximate coordinate data produced by the manual tracing, automatically scanning overlapping image outline portions with an image sensor, and producing accurate image outline coordinate data, wherein the accurate image outline coordinate data is produced by the steps of moving the receiving surface of the image sensor to selected approximate coordinate data positions as determined by the manual tracing, projecting the image outline area surrounding each approximate coordinate data position onto the receiving surface of the image sensor, comparing the signal level received from each approximate coordinate data position with the average signal level received from the area surrounding that coordinate data position, and assigning accurate image outline coordinate data based on differences between the coordinate data position signal level and the average signal level of the surrounding area.

2. A method according to claim 1 including comparing the accurate image outline coordinate data with the original image portion and correcting any deviations or omissions in the accurate image outline coordinate data.

3. A method according to claim 2 including displaying the accurate image outline coordinate data on a monitor along with at least a part of the picture image portion.

4. A method according to claim 2 including displaying the accurate image outline coordinate data on a monitor along with the approximate coordinate data.

5. A method according to claim 1 wherein the image outline are surrounding each coordinate data position includes at least one adjacent coordinate data position.

6. Apparatus for producing an accurate outline of a selected image portion in a picture, said apparatus comprising a coordinate data reader providing approximate outline coordinate data in response to manual tracing of the outline, a support for holding the picture in predetermined relation to the approximate outline coordinate data, an image sensor which automatically scans the image outline, a memory for recording signals generated by the image sensor, and a central processing unit for controlling the motion of the image sensor in accordance with the approximate outline coordinate data, the recording of signals generated by the image sensor, and the production of accurate outline coordinate data based on signals produced by the image sensor by moving the receiving surface of the image sensor to selected approximate coordinate data positions as determined by the manual tracing, comparing the signal level received from each approximate coordinate data position with the average signal level received from the area surrounding that coordinate data position, and assigning accurate image outline coordinate data based on differences between the coordinate data position signal level and the average signal level of the surrounding area.

7. Apparatus according to claim 6 including a monitor for selectively displaying an image corresponding to the accurate outline coordinate data, an image corresponding to the image signals produced by the image sensor, and an image corresponding to the approximate outline coordinate data.

* * * * *